(12) United States Patent
Hazel

(10) Patent No.: US 9,016,239 B2
(45) Date of Patent: Apr. 28, 2015

(54) HUMMINGBIRD FEEDER

(71) Applicant: Archie Hazel, Jonesboro, IL (US)

(72) Inventor: Archie Hazel, Jonesboro, IL (US)

(*) Notice: Subject to any disclaimer, the term of this patent is extended or adjusted under 35 U.S.C. 154(b) by 0 days.

(21) Appl. No.: 14/032,133

(22) Filed: Sep. 19, 2013

(65) Prior Publication Data
US 2015/0075435 A1     Mar. 19, 2015

(51) Int. Cl.
*A01K 39/04*     (2006.01)
*A01K 39/01*     (2006.01)
(52) U.S. Cl.
CPC .............. *A01K 39/0113* (2013.01); *A01K 39/04* (2013.01)
(58) Field of Classification Search
CPC .............. A01K 39/0206; A01K 39/02; A01K 39/0113; A01K 39/012
USPC ................... 119/72–81, 57.8, 57.9, 52.2, 52.3
See application file for complete search history.

(56) References Cited

U.S. PATENT DOCUMENTS

| | | | | |
|---|---|---|---|---|
| 3,292,589 A | * | 12/1966 | Williams | 119/77 |
| 4,691,665 A | * | 9/1987 | Hefner | 119/77 |
| D486,278 S | * | 2/2004 | Nauert | D30/199 |

* cited by examiner

*Primary Examiner* — Richard Price, Jr.
(74) *Attorney, Agent, or Firm* — James A. Italia; Italia IP

(57) ABSTRACT

A system for creating a plurality of sheltered stalls around feeding ports of a hummingbird feeder. The sheltered stalls may be formed by generally V-shaped members having opposed curved wings, one stall being formed beneath abutting wings of two abutting generally V-shaped members. The generally V-shaped members may be supported on mounting hooks which are either integral with or removable from the hummingbird feeder. The sheltered stalls and mounting hooks are red. The system may include the hummingbird feeder. The system deters dominant males from preventing use of the hummingbird feeder by competing hummingbirds.

12 Claims, 3 Drawing Sheets

HUMMINGBIRD FEEDER

FIELD OF THE INVENTION

The present invention relates to feeders for hummingbirds, and more particularly, to a system for sheltering individual feeding locations on a feeder.

BACKGROUND OF THE INVENTION

Hummingbird feeders have been provided to encourage hummingbirds to feed typically on a mixture of sugar and water. The feeders are typically located where a human observer can observe the feeding hummingbirds. However, use of a feeder by a plurality of hummingbirds is often discouraged by a dominant male which treats the feeder as his territory. The dominant male will watch over the feeder and attack or otherwise discourage other hummingbirds, which the dominant male may regard as interlopers. The result is that the feeder may be used by only one bird, thereby greatly diminishing the pleasure of the human observer, who most likely will want to see a number of hummingbirds.

SUMMARY OF THE INVENTION

The present invention addresses the above stated situation by providing a system for creating a plurality of feeding locations which are sheltered in that a hummingbird feeding at each port is concealed from direct view from above, and is afforded mechanical protection from attack from most directions. This encourages hummingbirds to utilize a hummingbird feeder even when a dominant male attempts to maintain the feeder as his personal territory as he attempts to discourage use of the feeder by other hummingbirds.

To this end, the invention contemplates guards which may be placed over individual feeding ports of the feeder. The guards create a plurality of individual stalls each separated from neighboring stalls, and which provide cover from direct view from above and from most sides.

Apparatus of the system includes generally V-shaped members which have flared wings. When placed in abutment or near abutment, a stall is created below the opposed wings of two abutting V-shaped members.

The system may comprise a plurality of such V-shaped members which may be individually permanently mounted on a hummingbird feeder, may be removably mounted on a hummingbird feeder, or which may be formed integrally with a hummingbird feeder.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
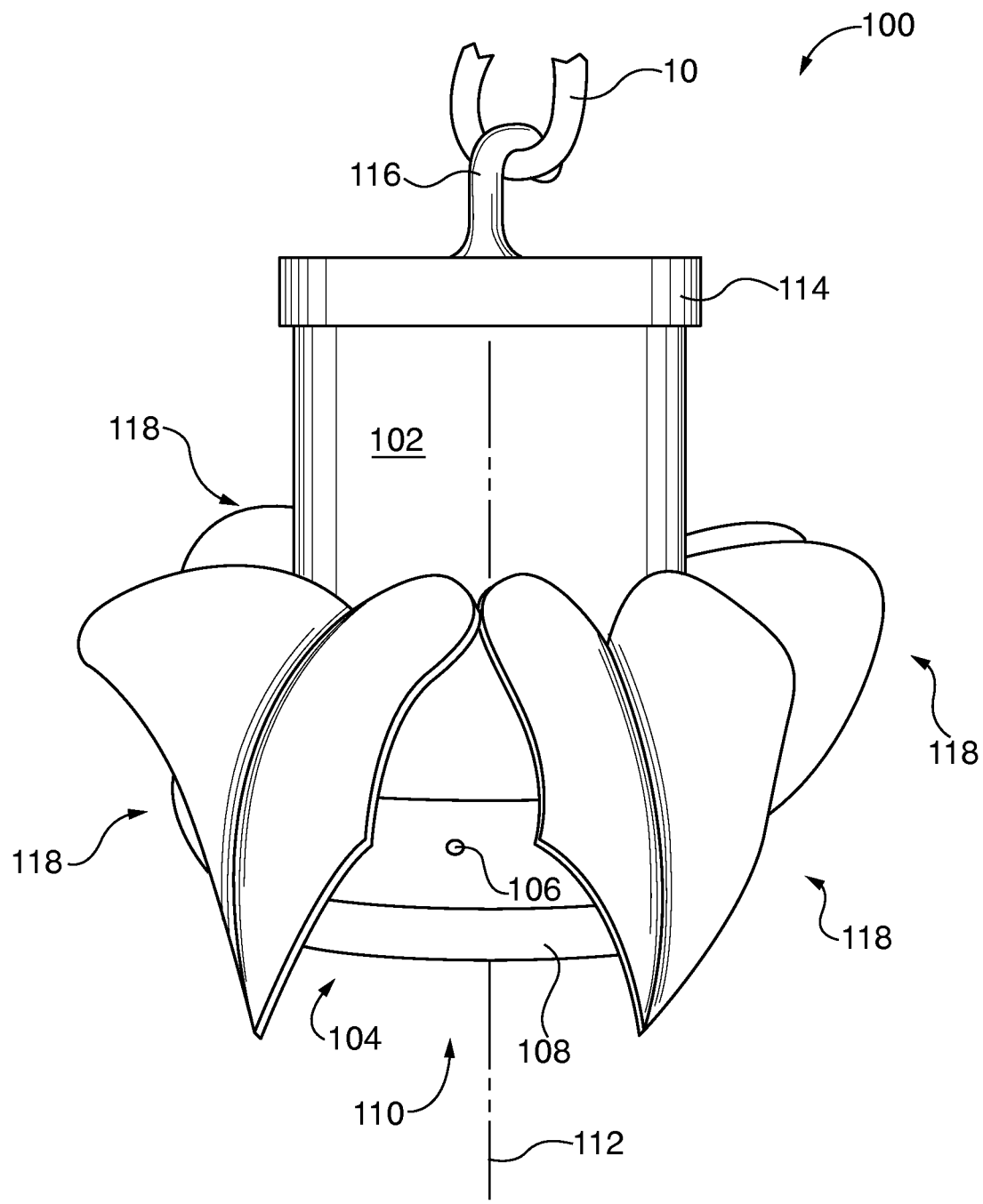
FIG. 1 is an elevational view of a hummingbird feeder, according to at least one aspect of the invention.

Referring first to FIG. 1, according to at least one aspect of the invention, there is shown a hummingbird feeder 100 including a reservoir 102 configured to contain a liquid, such as a mixture of sugar and water, a base 104 having a plurality of feeding ports 106 each in liquid communication with the reservoir 102, a feeding perch 108 affording a perching position for a hummingbird (none shown) at each one of the feeding ports 106, and a covered stall 110 over each feeding port 106. The feeding perch 108 may take the form of a rail extending around the periphery of the base 104. The covered stall 110 is configured to receive and accommodate a hummingbird therein, and to shelter the hummingbird from direct view from above the feeding perch 108 and from contact from above the feeding perch 108, and from view and contact from lateral sides of the covered stall 110. The hummingbird is visible only from that end of the covered stall 110 away from a vertical center line 112 of the reservoir 102. The reservoir 102 may include a removable cover 114. The removable cover 114 may include a hook 116 configured to enable the hummingbird feeder to be suspended from an environmental object such as a link of a chain 10.

Figure 2:
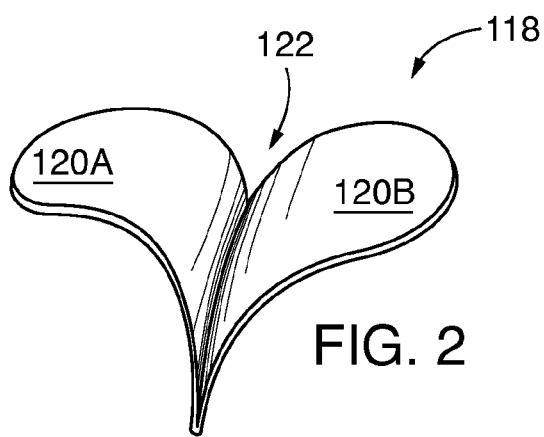
FIG. 2 is a perspective detail view of one of several components seen about the bottom of FIG. 1.

Referring also to FIG. 2, the covered stalls 110 may comprise generally V-shaped members 118 each having two curved wings 120A, 120B in generally mirror image relationship, with a cleft 122 existing between the curved wings 120A, 120B. The cleft 122 extends generally radially and horizontally from the vertical center line 112 (FIG. 1) of the hummingbird feeder 100 when the generally V-shaped member 118 is mounted on the hummingbird feeder 100.

Figure 3:
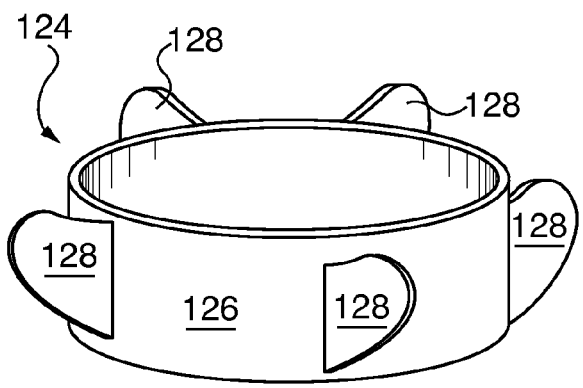
FIG. 3 is a perspective view of an optional mounting assembly for the components typified by that illustrated in FIG. 2.

The generally V-shaped members 118 may be mounted to the reservoir 102 or the base 104 in any of several ways. Referring to FIG. 3, a hook assembly 124 may comprise a ring 126 which fits closely yet slidably around the reservoir 102, and which includes a plurality of mounting hooks 128 projecting outwardly from the ring 126. One mounting hook 128 is provided for each generally V-shaped member 118. The mounting hooks 128 are spaced angularly around the axis 112 so that the generally V-shaped members 118 abut or nearly abut one another. The mounting hooks 128 are configured to support the generally V-shaped members 118, and therefore, the covered stalls 110 are supported over the feeding ports 106.

It should be noted at this point that orientational terms such as over and below refer to the subject drawing as viewed by an observer. The drawing figures depict their subject matter in orientations of normal use, which could obviously change with changes in body posture and position. Therefore, orientational terms must be understood to provide semantic basis for purposes of description only, and not in a limiting capacity.

Figure 4:
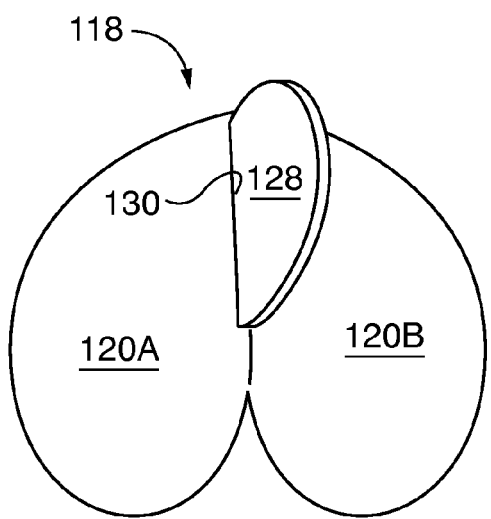
FIG. 4 is a perspective detail view of a component mounted on the optional mounting of FIG. 3.

FIG. 4 shows a mounting hook 128 which engages a generally V-shaped member 118 by passing through a slot 130 configured to receive the mounting hook 128. The arrangement including the mounting hooks 128 enables the associated generally V-shaped members 118 to be manually separable from the mounting hooks 128.

The mounting hooks 128 are configured to be secured to the hummingbird feeder for example by engagement of the ring 126 (FIG. 3) such as by encirclement of the reservoir 102, the mounting hooks 128 thereby being manually separable from their associated generally V-shaped members 118. Also, with the arrangement including the ring 126, the mounting hooks 128 are manually removable from the reservoir 102.

Figure 5:
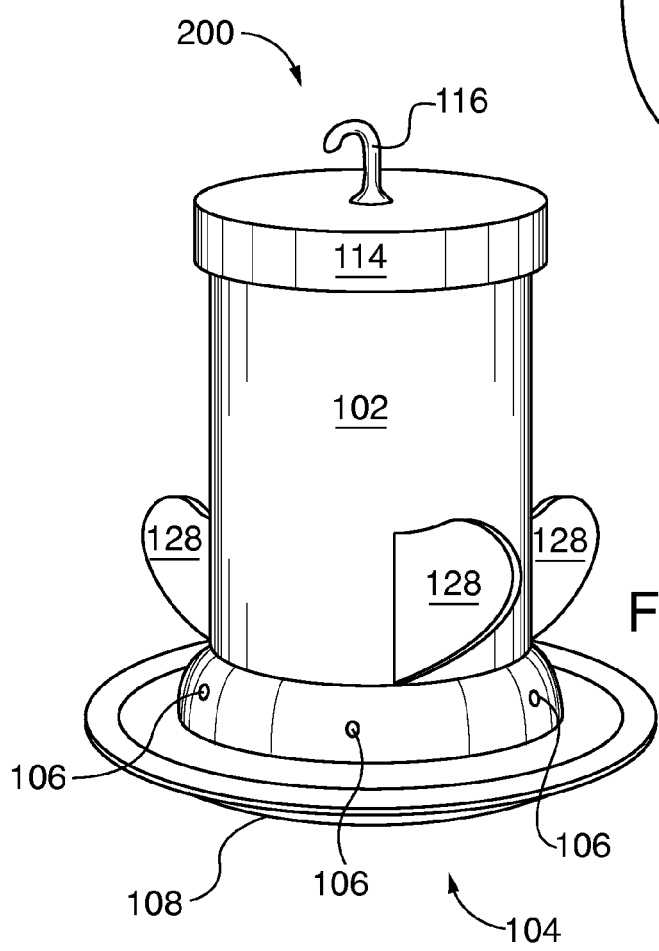
FIG. 5 is a perspective view of an alternative hummingbird feeder, according to at least one aspect of the invention.

Referring to FIG. 5, as an alternative to being manually removable, the mounting hooks 128 are integral with the reservoir 102. Of course, the mounting hooks 128 could be made integral with the base if desired (this option is not shown).

Figure 6:
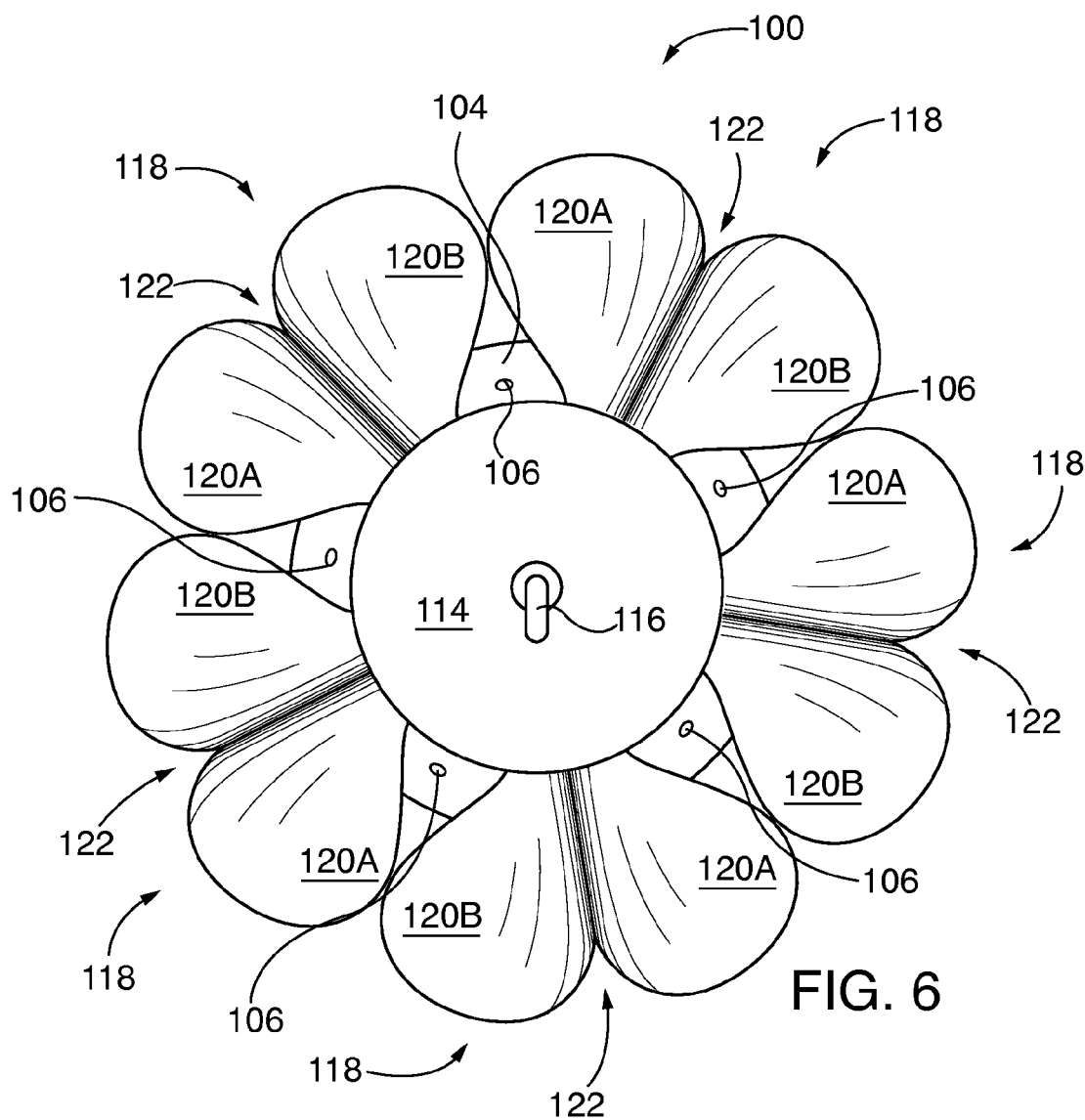
FIG. 6 is a top plan view of a hummingbird feeder, accord to at least one aspect of the invention.

The invention may be thought of as a hummingbird feeder having covered stalls, such as the hummingbird feeder 100 of FIG. 1, or alternatively, as a system for creating an individual stall over each feeding port of a hummingbird feeder. Referring to FIGS. 1 and 6, such a system may include a plurality of generally V-shaped members 118 configured to partially cover the feeding port 106 of the hummingbird feeder, thereby creating the covered stalls 110 over the feeding ports 106 when two of the generally V-shaped members 118 are mounted in a deployed position in abutment on the hummingbird feeder over any one feeding port 106. The deployed position is that illustrated in FIGS. 1 and 6.

Seen best in FIG. 6, when each one of the generally V-shaped members 118 is mounted to the hummingbird feeder 100 in the deployed position, each generally V-shaped member 118 when viewed from above presents a shape which is not a parallelepiped. Notably, with each generally V-shaped member 118 mounted to the hummingbird feeder 100 in the deployed position, each wing 120A or 120B of each generally V-shaped member 118 when viewed from above presents a shape which is generally ovoid.

The invention may also be thought of as a method of enabling competing hummingbirds from being discouraged from using a hummingbird feeder by a dominant hummingbird, the method including forming a covered stall (e.g., the covered stall 110 of FIG. 1) over each feeding port (e.g., the feeding port 106) of the hummingbird feeder. As particularly seen in FIG. 6, the method may include causing the covered stalls to resemble flower petals when viewed from above. The ovoid shape of the wings 120A, 120B and the curvature generating the cleft 122 contribute to the impression of flower petals.

In keeping with hummingbirds' penchant for red flowers and environmental objects evoking an impression of a red flower, the generally V-shaped members 118, and hence the covered stalls 110, and the mounting hooks 128 are colored red. However, as non-limiting examples, the feeder guards and parts may be blue, green, purple, yellow, orange, black, white, brown, pink or any other combination of colors.

Although the invention has been described in terms of certain components being referred to in either the singular or the plural, other arrangements are possible. For example, the covered stalls 110 could be made from components other than the generally V-shaped members 118, such as a unitary or single piece component (this option is not shown).

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A humming bird feeder including a plurality of feeding ports at least one feeding port, the feeder comprising: a plurality of members, wherein each member includes a lateral wall portion and a cover portion, wherein a pair of separate members cooperate to create a plurality of covered stalls, wherein each said covered stall includes a singular feeding port, wherein each said covered stall is configured to receive and accommodate a substantial portion of a hummingbird body therein, and to shelter the hummingbird from view both from above and laterally when utilizing said feeding port.

2. The feeder of claim 1, wherein the plurality of members are generally V-shaped, wherein each V-shaped member has a curved first wing and an opposed second wing of generally mirror image, a cleft exists between the first wing and the second wing, and the cleft extends generally radially and horizontally from the vertical center line of the hummingbird feeder when the generally V-shaped member is mounted on the hummingbird feeder, and wherein each one of the plurality of covered stalls is created by a pair of generally V-shaped members.

3. The feeder of claim 2, wherein each one of the generally V-shaped members is colored red.

4. The feeder of claim 2, wherein when each one of the generally V-shaped members is mounted to the hummingbird feeder in the deployed position, each generally V-shaped member when viewed from above presents a shape which is not a parallelepiped.

5. The feeder of claim 4, wherein when each one of the generally V-shaped members is mounted to the hummingbird feeder in the deployed position, each wing of each generally V-shaped member when viewed from above presents a shape which is generally ovoid.

6. A hummingbird feeder including:
a reservoir configured to contain a liquid; a base having a plurality of feeding ports at least one feeding port each in liquid communication with the reservoir; and a plurality of members, wherein each member includes a lateral wall portion and a cover portion, wherein a pair of separate, members cooperate to create a plurality of covered stalls, wherein each said covered stall includes a singular feeding port wherein each said covered stall is configured to receive and accommodate a substantial portion of a hummingbird body therein, and to shelter the hummingbird from view both from above and laterally when utilizing said feeding port.

7. The hummingbird feeder of claim 6, wherein the reservoir includes a removable cover.

8. The hummingbird feeder of claim 6, further comprising a hook configured to enable the hummingbird feeder to be suspended from an environmental object.

9. The hummingbird feeder of claim 6, wherein each one of the covered stalls is red.

10. The hummingbird feeder of claim 6, wherein the covered stalls comprises generally V-shaped members each having two curved wings in generally mirror image relationship, with a cleft formed between the curved wings.

11. The hummingbird feeder of claim 10, wherein each one of the generally V-shaped members has a curved first wing and an opposed second wing of generally mirror image, a cleft exists between the first wing and the second wing, and the cleft extends generally radially and horizontally from the vertical center line of the hummingbird feeder when the generally V-shaped member is mounted on the hummingbird feeder.

12. The hummingbird feeder of claim 10, wherein when each one of the generally V-shaped members is mounted to the hummingbird feeder in the deployed position, each wing of each generally V-shaped member when viewed from above presents a shape which is generally ovoid.

\* \* \* \* \*